May 1, 1962 C. D. MOORE 3,032,370
MOTOR VEHICLE BODY MOUNTS
Original Filed Jan. 29, 1958
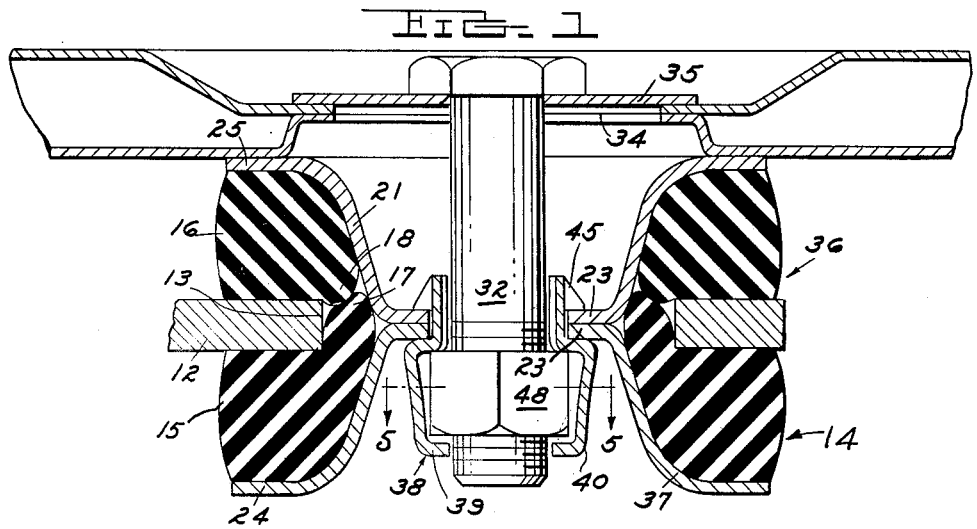
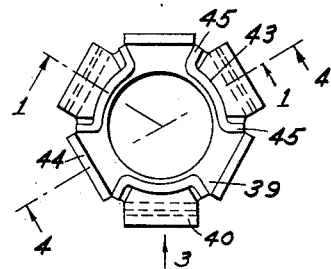
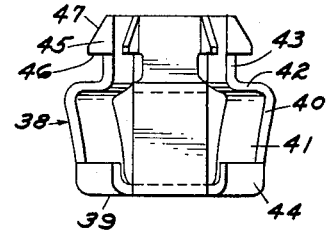
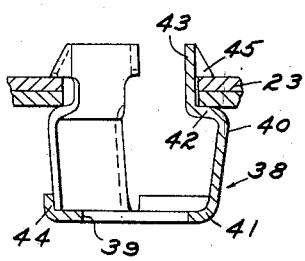
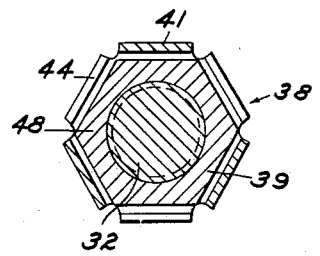
CHARLES D. MOORE
INVENTOR.
BY  J. R. Faulkner
    J. J. Roethel
    ATTORNEYS United States Patent Office 3,032,370
Patented May 1, 1962

3,032,370
MOTOR VEHICLE BODY MOUNTS
Charles D. Moore, Birmingham, Mich., assignor to Ford Motor Company, Dearborn, Mich., a corporation of Delaware
Original application Jan. 29, 1958, Ser. No. 711,955, now Patent No. 2,976,080, dated Mar. 21, 1961. Divided and this application Aug. 8, 1960, Ser. No. 48,108
5 Claims. (Cl. 296—35)

This invention relates generally to resilient mounts for attaching a motor vehicle body to a motor vehicle frame.

It is customary to attach a motor vehicle body to the motor vehicle frame by means of a plurality of spaced body mounts incorporating resilient insulators adapted to insulate the body against frame vibrations and noise. In a copending application of A. L. Schaldenbrand, Serial No. 509,815, filed May 20, 1955, now Patent Number 2,838,339, issued June 10, 1958, there are disclosed body mounts which are adapted to be preassembled or premounted on the vehicle frame. With premounted body mounts it is only necessary for the assemblers in assembling the body to the frame to make a simple insertion of the fastening means to each body mount. Problems relative to the handling of a plurality of mounting device parts on the body assembly line and problems of proper positioning and alignment of the parts are substantially eliminated.

It is an object of the present invention to provide an improved embodiment of a body mount of the type disclosed in the above identified copending application. The improved embodiments of the body mounts are characterized by a reduction in the number of parts comprising the mount by simplification of fabrication and by simplification of the method of attachment to the vehicle frame.

Basically, the body mount embodying the present invention comprises a pair of resilient insulators formed with a large central aperture and adapted to be positioned on opposite sides of a frame outrigger bracket. The insulators are retained on the bracket members by retaining members which in general comprise peripherally flanged cup-shaped members. The retaining members are positioned in inverted relationship to each other with their respective centrally apertured cup portions abutting each other and suitably secured by fastening means. Suitable separate cage means is provided to nonrotatably retain a nut means adapted to receive the body hold-down bolt used to connect the body to each of the body mounts carried by the frame. The cage means has a further function in that it is so constructed and arranged as to provide the means for securing the retainer members on the frame outrigger bracket member.

Other objects, advantages and features of this invention will be made more apparent as this description proceeds, particularly when considered in connection with the accompanying drawings, wherein:

FIG. 1 is a sectional view taken substantially through line 1—1 of FIG. 2 illustrating the body mount embodying the present invention as assembled to a frame part and body part;

FIG. 2 is a bottom elevation of the nut retainer device of the present embodiment;

FIG. 3 is an elevation taken substantially along the line 3 of FIG. 2;

FIG. 4 is a sectional view taken substantially through the line 4—4 of FIG. 2; and FIG. 5 is a sectional view taken substantially through the line 5—5 of FIG. 1.

This application is a division of my copending application Serial No. 711,955, filed January 29, 1958, now Patent 2,976,080 issued March 21, 1961.

Referring now to the drawing, there is illustrated the fragmentary end portion 12 of the horizontal flange of a motor vehicle frame outrigger bracket carried by and extending laterally outwardly from a vehicle frame (not shown) in a conventional manner. The horizontal flange 12 is formed with an aperture 13 therein. The body mounting device, generally designated 14, comprises a pair of centrally apertured resilient insulators 15 and 16, respectively. The insulators are molded of a suitable grade of rubber and are initially of generally cylindrical form in their free shape, but as will be noted they are compressed and distorted when assembled to the frame bracket.

The lower insulator 15 is provided with a centrally located annular or ring portion 17 projecting upwardly from its upper surface. This annular or ring portion is adapted to fit within the bracket aperture 13 thereby to act as an insulating spacer means for the body mount. The upper insulator 16 is provided with a much smaller depending annular or ring portion 18. As shown, see FIG. 1, the annular or ring portion 18 projects into the aperture 13 slightly in abutting relation to the upper surface of the annular or ring portion 17. The annular or ring portion 18 functions primarily as a centering or locating means to ensure proper positioning of the insulator 16 during assembly of the parts of the body mount on the bracket flange 12.

The insulators 15 and 16 are held on the bracket flange 12 by means of a pair of centrally apertured retaining members 37 and 21. The retaining members 37 and 21 are generally cup-shaped and extend into the apertures in the rubber insulators 15 and 16, respectively. The retaining members are positioned in inverted relation to each other, that is, with their respective base portions 23 abutting each other. Each of the cup-shaped retaining members is formed with a peripheral flange 24 and 25, respectively, engaging the outer sides of the respective insulators 15 and 16 to enable them to be compressed and clamped to the flange 12 of the outrigger bracket.

The retaining members 21 and 37 are maintained in assembled relation by a dual function nut retainer or nut cage device, generally designated 38. In addition to functioning as a nut cage or nut retaining means, the nut retainer 38 also functions to secure or clamp the upper and lower insulator retaining members together, as will be explained.

The nut retainer 38 comprises a member having a substantially hexagonally shaped base portion 39 (see FIG. 5). Projecting upwardly from alternate sides of the base portion are upstanding leg portions 40. As best seen in FIG. 4, each upstanding leg portion 40 has a lower substantially straight portion 41 inclined outwardly at a slight angle. Each leg portion 40 is provided at the upper end thereof with a horizontally inwardly extending portion 42 which, in turn, terminates in an axially upstanding end portion 43. The end portions 43 are arcuately formed to provide a cylindrical contour, the external diameter of the cylindrical section being slightly less than the diameter of the central apertures in the retaining member base portions 23.

Those alternate sides of the nut retainer base portion 39 not having the leg portions 40 projecting upwardly therefrom are provided with short upwardly extending flanges or lip portions 44.

It will be noted that the end portion 43 of each upstanding leg portion 40 is provided on each lateral edge with a radially extending lug 45. Each lug 45 is substantially triangular in shape being provided with a horizontal base 46 and an upwardly and inwardly inclined side edge 47 terminating at the upper edge of the end portion 43.

The assembly of the body mount 36 to the bracket flange 12 may follow substantially the following procedure. The insulators 15 and 16 and the respective retaining members 21 and 37 are positioned on the bracket flange 12. Next, the nut retainer 38 with a suitable nut 48 positioned therein is aligned with the central aperture in the base portion 23 of the lower insulator retaining member 37. It will be understood that the retainer 38 will be made of a sufficiently resilient metal so that the leg portions 40 will flex inwardly as the lugs 45 are forced through the retaining member apertures. Initially, the base portions 23 of the retaining members 21 and 37 will be spaced from each other. As the nut retainer lugs are forced through the central apertures the resilient insulators will be compressed until the two base portions 23 abut or nearly abut each other. As soon as the lugs penetrate the abutting base portions, the resiliency of the leg portions 40 will cause the end portions 43 to snap outwardly. The retaining member base portions will thus be locked between the shoulders formed by the horizontal portions 42 of the upstanding legs 40 and the lug bases 46. The nut 48 will thus be nonremovably and nonrotatably caged within the nut reteainer 38 in position to receive the body hold-down bolt 32.

Although the nut retainer was described as being shaped to receive a hexagonally shaped nut 48, it will be readily apparent that the device may be adapted to retain nuts having a different shape, such as the square nut 28 used in the embodiment described in the above-mentioned U.S. Patent 2,976,080.

During the manufacture of the vehicle, a body mount 36 is assembled upon each of the frame outrigger brackets prior to the dropping of the vehicle body upon the frame. The vehicle body is dropped on the frame with the underbody assembly 33 positioned so that the openings 34 therein are in substantial axial alignment with the body mounts 36. A suitable lock washer 35 is positioned over the body opening 34 and the body holddown bolt 32 is inserted therethrough and threadably engaged with the nut 29. Suitable tightening of the bolt completes the assembly of the underbody to the mount.

The opening 34 in the underbody assembly is sufficiently large to accommodate slight misalignments between the various body mounts and the body. It will be readily apparent that with the mounts preassembled to the frame outrigger brackets the final assembly of the body to the frame is greatly simplified.

It will be understood that the invention is not to be limited to the exact construction shown and described, but that various changes and modifications may be made without departing from the spirit and scope of the invention, as defined in the appended claims.

I claim:

1. A body mount for connecting a motor vehicle body part to an apertured motor vehicle frame part, comprising a pair of apertured resilient insulators positioned on opposite sides of said frame part, a pair of retaining members adjacent the outer sides of said insulators having depressed apertured central portions extending into the apertures in said insulators, cage means having a plurality of spaced leg portions thereon projecting through the depressed apertured central portions of said retaining members, said leg portions each having a shoulder thereon and terminating at the extremity thereof in lug means, the edge portions of said depressed apertured central portions being engaged between said shoulders and lug means to maintain said central portions in abutting relation to each other and said insulators under compression thereby clamping said insulators to said frame part to form an assembly thereon, and fastening means extending through said apertures to secure said body part to said frame part through said body mount, said cage means nonrotatably retaining one element of said fastening means on said body mount in alignment with said apertures for engagement by another element thereof.

2. A body mount for connecting a motor vehicle body part to an apertured motor vehicle frame part, comprising a pair of apertured resilient insulators positioned on opposite sides of said frame part, one of said insulators having a spacer portion integral therewith positioned within the aperture of said frame part, a pair of retaining members adjacent the outer sides of said insulators having depressed apertured central portions extending into the apertures in said insulators, cage means having a plurality of spaced leg portions thereon projecting through the depressed apertured central portions of said retaining members, said leg portions each having a shoulder thereon and terminating at the extremity thereof in lug means, the edge portions of said depressed apertured central portions being engaged between said shoulders and lug means to maintain said central portions in abutting relation to each other and said insulators under compression thereby clamping said insulators to said frame part to form an assembly thereon, and fastening means extending through said apertures to secure said body part to said frame part through said body mount, said cage means nonrotatably retaining one element of said fastening means on said body mount in alignment with said apertures for engagement by another element thereof.

3. A body mount for connecting a motor vehicle body part to an apertured motor vehicle frame part, comprising a pair of apertured resilient insulators positioned on opposite sides of said frame part, a pair of retaining members adjacent the outer side of said insulators having depressed apertured central portions extending into the apertures in said insulators, cage means having a plurality of spaced leg portions thereon projecting through the depressed apertured central portions of said retaining members, said leg portions each having a shoulder thereon and terminating at the extremity thereof in lug means, the edge portions of said depressed apertured central portions being engaged between said shoulders and lug means to maintain said central portions in abutting relation to each other and said insulators under compression thereby clamping said insulators to said frame part to form an assembly thereon, and fastening means extending through said apertures to secure said body part to said frame part through said body mount, said fastening means comprising a nut and bolt, said cage means positioning and nonrotatably retaining said nut in substantial alignment with said apertures for engagement by said bolt.

4. A body mount for connecting a motor vehicle body part to an apertured motor vehicle frame part, comprising a pair of apertured resilient insulators positioned on opposite sides of said frame part, a pair of retaining members adjacent the outer sides of said insulators having depressed apertured central portions extending into the apertures in said insulators, cage means having a plurality of spaced resilient legs each having a first portion effective to clamp said depressed aperture central portions together to maintain said insulators under compression thereby clamping said insulators to said frame part to form an assembly thereon and a second portion, and fastening means extending through said apertures to secure said body part to said frame part through said body mount, said second portions of said legs forming a cage for nonrotatably retaining one element of said fastening means on said body mount in alignment with said apertures for engagement by another element thereof.

5. A body mount for connecting a motor vehicle body part to an apertured motor vehicle frame part, comprising a pair of apertured resilient insulators positioned on opposite sides of said frame part, a pair of retaining members adjacent the outer sides of said insulators having depressed apertured central portions extending into the apertures in said insulators, cage means having a plurality of spaced resilient legs, each of said legs having a first portion effective to clamp said depressed aperture central portions together to maintain said insulators under compression thereby clamping said insulators to said frame part to form an assembly thereon and a second portion, and fastening means extending through said apertures to secure said body part to said frame part through said body mount, said fastening means comprising a nut and bolt, said second portions of said legs forming a cage for positioning and nonrotatably retaining said nut means in substantial alignment with said apertures for engagement by said bolt.

References Cited in the file of this patent

UNITED STATES PATENTS

| | | |
|---|---|---|
| 1,871,963 | Dill | Aug. 16, 1932 |
| 2,099,655 | MacFadden | Nov. 16, 1937 |
| 2,132,840 | Workman | Oct. 11, 1938 |
| 2,838,339 | Schaldenbrand | June 10, 1958 |
| 2,883,232 | Olley | Apr. 21, 1959 |

FOREIGN PATENTS

| | | |
|---|---|---|
| 504,865 | Canada | Aug. 3, 1954 |